United States Patent

Schlickeiser

[15] 3,652,996

[45] Mar. 28, 1972

[54] INFORMATION RETRIEVING ARRANGEMENT

[72] Inventor: Klaus Schlickeiser, Boll near Hechingen, Germany

[73] Assignee: Dipl. Ing. Walter Buhmann Elektro-Apparatebau GmbH, Hechingen, Hohenzollern, Germany

[22] Filed: Feb. 9, 1970

[21] Appl. No.: 9,783

[30] Foreign Application Priority Data

Feb. 7, 1969 Germany......................P 19 06 136.0

[52] U.S. Cl. ....................................340/172.5, 179/1002. R

[51] Int. Cl. ..........................................................G11b 7/00

[58] Field of Search.............340/172.5; 179/100.2; 242/200, 242/202

[56] References Cited

UNITED STATES PATENTS

| | | | |
|---|---|---|---|
| 2,683,568 | 7/1954 | Lindsay | 179/100.2 |
| 3,032,613 | 5/1962 | Namenyi-Katz | 179/100.2 |
| 3,111,282 | 11/1963 | Proctor | 242/200 |
| 3,451,635 | 6/1969 | Miville et al. | 242/202 |

*Primary Examiner*—Raulfe B. Zache
*Attorney*—Michael S. Striker

[57] ABSTRACT

Tape units are provided each including a pair of spaced rotatable spools accommodated in a casing, a multiple-track magnetic tape trained about the spools for advancement in a predetermined path. A device for using these tape units is arranged to cooperate with them and includes a magnetic head displaceable transversely to the path of the magnetic tape, advancing means for advancing the tape in the path in incremental steps of identical length each corresponding to a bit of retrievable information on the tape, a plurality of optically detectable indicia on the tape successively spaced at intervals corresponding to the length of one of the steps, detecting means for optically detecting successive ones of the indicia in response to incremental stepwise advancement of the tape, and for producing a recognition signal, storage means actuatable in response to detection of successive ones of the indicia for storing the recognition signals, and retrieving means for selecting a recognition signal corresponding to a predetermined bit of information which it is desired to retrieve, and for cooperating with the storage means nd the advancing means in a sense advancing the tape until correspondence of the predetermined bit of information with the magnetic head.

12 Claims, 8 Drawing Figures

INVENTOR
KLAUS SCHLICKEISER

INFORMATION RETRIEVING ARRANGEMENT

BACKGROUND OF THE INVENTION

The present invention relates generally to an information retrieving arrangement, and more particularly to a cassette-shaped magnetic tape storage arrangement for the control of office machines, particularly automated letter writers and analogous apparatuses.

Apparatuses of this type are controlled by magnetic tape which can be coiled onto and from two spools and which has a plurality of tracks, with information being stored in form of bits on these tracks and with the tape being advanceable from spool to spool in steps of identical length each of which is associated with one of the bits of information. Each of the tracks contains a series of bits of information corresponding in total to approximately the length of a typed page of text, for instance correspondence. Such devices are used where identical text must be typed very frequently but where it is not practical or not desired—for whatever reason—to print the text. Thus, the text should on the one hand appear in type-written form so that the item of correspondence is not recognizable as a form letter, but on the other hand the large number of identical ones of such letters—or whatever other written communication is involved—makes it impractical to have them individually typed. The answer is the type of arrangement under discussion where the typewriter—or generally office machine—is controlled by the magnetic tape on which the text to be typed is stored and which actuates the typewriter and causes it to type the standard text. These devices utilize a magnet head, or more than one of these magnet heads, which is shiftable transversely of the elongation of the magnetic tape so that the desired track can be selected by shifting the head. Frequently, the entire text stored on any given track is to be typed completely once the track has been selected. With this type of arrangement it is particularly practical to produce a large number of identical letters which are to be sent to different recipients.

However, a track has a relatively large storage capacity which in many cases is not utilized fully because the individual paragraphs which can be used in such automated correspondence are usually significantly shorter than a full typewritten text page. It is rare that with this type of correspondence an entire page is to be reproduced automatically; usually individually typewritten paragraphs are interspersed with paragraphs which are reproduced by activation of the office machine via the tape, or else pages are made up of individual paragraphs which are located on different tracks of the tape and which are selected and combined to fit the circumstances of a given piece of correspondence. Of course, this makes it necessary to be able to in fact select individual paragraphs contained on one and the same tape but on different tracks thereof. For this reason it is desirable to subdivide the tracks on the tape lengthwise into sections and to make these sections individually selectable at will, analogous to the manner in which the tracks themselves are individually selectable. It is known to utilize mechanical devices which operate synchronously with the tape and cooperate with switches; these, however, are not well suited for the purpose at hand because the possibility for the arrangement of switches are limited by prevailing space limitations. Furthermore, such arrangements are not flexible enough to meet the various requirements.

In addition there is the fact that the actual tape position can never be precisely in correspondence with the position of the positioning device because of deviations of various types which occur so that it would be necessary to leave large spaces between individual selected paragraphs.

It is also known to provide a magnetic control track on the magnetic tape itself. While the use of such a track permits better synchronism of the respective tape positions, it also has certain disadvantages. Not only is the available space in a cassette or cartridge which are usually used to house such tapes, so small that it appears almost impossible to provide room not only for the transversely shiftable magnet head but also for a stationary magnet head with the necessary guide rolls, tape contact surfaces and the like, but also a second magnetic detecting arrangement would double the wear on the tape. Furthermore, any error in the guide track would adversely influence the selection of all tracks containing stored information.

SUMMARY OF THE INVENTION

It is, accordingly, an object of the present invention to provide an information retrieving arrangement which is not possessed of the aforementioned disadvantages.

More particularly it is an object of the present invention to provide a cassette-type storage arrangement of the type under discussion wherein the respective tape position is detectable with great precision and is selectable at will. The components necessary are to be small and inexpensive but nevertheless assure a high reliability.

In accordance with the present invention this is achieved in that one track of the magnetic tape is provided with optically detectable markings and spacings corresponding to the distance between bits of recorded information, which serve for identification of the tape position upon detection via a detecting device and which influence a counter which is successively advanced with each recorded bit of information, via which counter—in case of coincidence with a value selected by the program control device—a certain recorded section of the magnetic tape is selectable.

According to the invention the optically detectable markings are in form of perforations, with the diameter of the perforations and of the detecting light beam being selected so as to have such a relationship that the distance between the switching points of an impulse former at the positive and negative flank of the current produced by a photoelectric element corresponds to the start-stop gap between the bit regions of two successive pieces of stored information.

In this manner it is guaranteed that the tape will always be arrested exactly at the middle of the start-stop gap and that a further advancement in forward as well as in reverse direction is possible. Advantageously the arrangement is such that the flanks of the detecting current always have the same direction and that the impulses caused by them in the impulse former influence the tape transport control, with the switching point of the impulse former being located in the middle between the light current and the dark current of the photoelectric detecting element.

The device is so constructed that the program control device permits setting of a device storing values, which is connected with the counter controlled by the optical markings of the magnetic tape via a comparator with which it is possible to produce in case of coincidence of the counter values a signal which influences the tape transport control. It is a particular advantage that the program control device is connected with the value storing device via a coding circuit which, in accordance with the arrangement of the text sections in the respective tape cassette, can be influenced by selectively insertable actuating elements in the frame of the cassette which in turn cooperate with the contacts. The combination of the actuating elements can be so selected that it is possible to obtain a great number of associations of text section designations with the values stored in the value storing device and which respectively characterize the text section designations.

It is further advantageous to provide at predetermined locations in the track of the optically detectable markings additional markings which are also in form of apertures, and which on detection by a separate detecting arrangement produce impulses which serve via a coincidence circuit to re-set the counter. This eliminates the need for additional space for the provision of zero setting markings and it further assures that such markings can be provided in case of need without any difficulties at the precise locations.

A particularly advantageous and small dimensioned embodiment of the arrangement according to the present invention is so constructed that the tape spools utilize spring biasing means and have oppositely directed torques which compensate one another with reference to the drive shaft of the cassette and which serve to maintain the tape tensioned, and further in that there is provided an arresting device which operates when the cassette is moved from the user device and which serves to move the tape spools to a defined zero position under utilization of the residual torque resulting from the presence of unequal amounts of tape on the different spools. Advantageously, one of the two spools is freely turnably mounted on its shaft and connected with the same by a spiral coil, whereas the other is fast with its shaft, with both shafts being connected by a motion transmitting drive. It is also advantageous that the tape arresting device cooperate with a device for opening of the cassette cover on insertion into the user device.

For the arrangement of the optical detecting means it is advantageous that the tape storage device does not require pressure means for the magnetic tape at the detecting location. This is achieved in advantageous manner in that the magnetic tape—which is guided over two reversing elements—is constructed as a wide strip and that between these two reversing elements there is located a magnet head shiftable transversely to the elongation of the tape and contacting the latter, with the magnet head having a tape contacting surface which contacts at least approximately half the width of the tape.

Finally, it is an advantage to provide a device which frees the dust-tight closure of the cassette housing for purposes of opening the latter when the cassette is introduced into the user device and readied for use.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
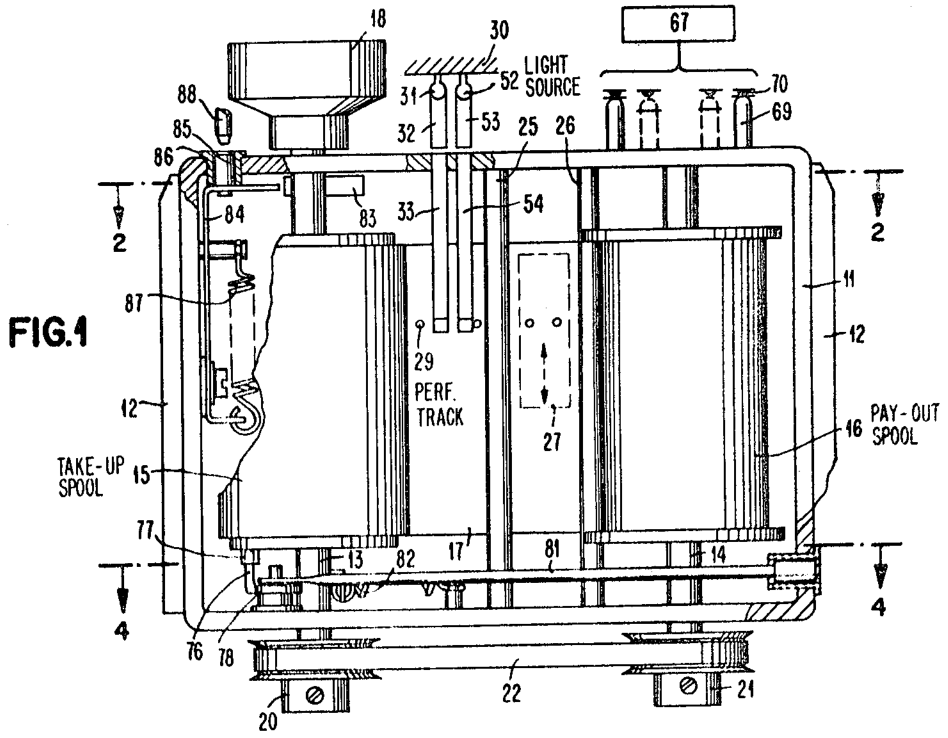
FIG. 1 is a bottom plan view of a magnetic tape cassette according to the present invention, with the bottom plate of the cassette removed.
Figure 2:
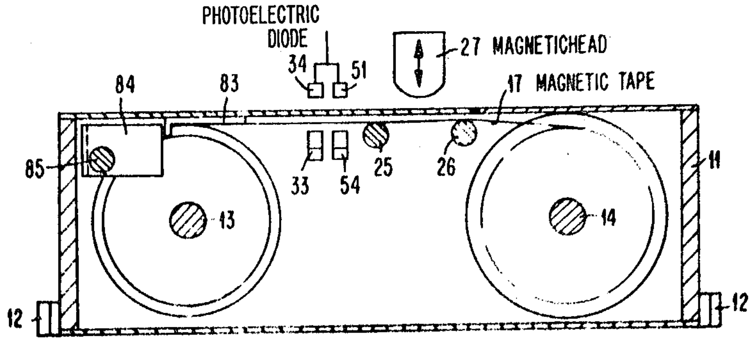
FIG. 2 is a section taken on the line2—2 of FIG. 1.

FIG. 1 illustrates the magnetic tape cassette in a bottom view, with the bottom plate of the cassette removed and with the underside of the magnetic tape showing. Reference numeral 11 identifies the frame of a cassette, and reference numeral 12 identifies lateral guides which cooperate with non-illustrated corresponding guide means on a user device so that the cassette will be properly positioned on insertion into such a user device. Shafts 13 and 14 are journalled in the cassette frame 11 and respectively accept the take-up spool 15 and the Pay-out spool 16 of the magnetic tape 17. In the illustrated embodiment the take-up spool 15 is rigidly connected with the shaft 13 and, on insertion into a user device, it becomes connected with the tape drive via the coupling 18. The pay-out spool 16, on the other hand, is freely turnably mounted on shaft 14 and connected with the same via a spiral spring 19 (see FIG. 3). The shafts 14 and 15 are connected with reference to the angular position by an endless toothed belt 22 which is convoluted about toothed gears 20 and 21 respectively mounted on the shafts 14 and 15.

Figure 3:
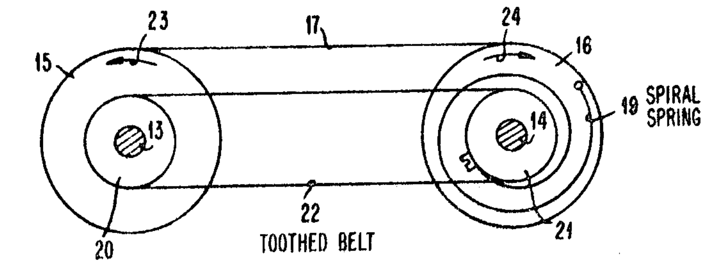
FIG. 3 is a diagrammatic view of the tape coiling system of the cassette in FIG. 1.
Figure 4:
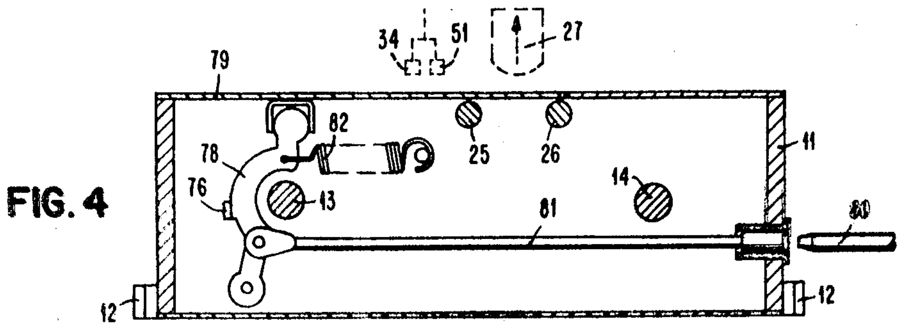
FIG. 4 is a section on line 4—4 of FIG. 1, showing the cassette with a closed cover.
Figure 5:
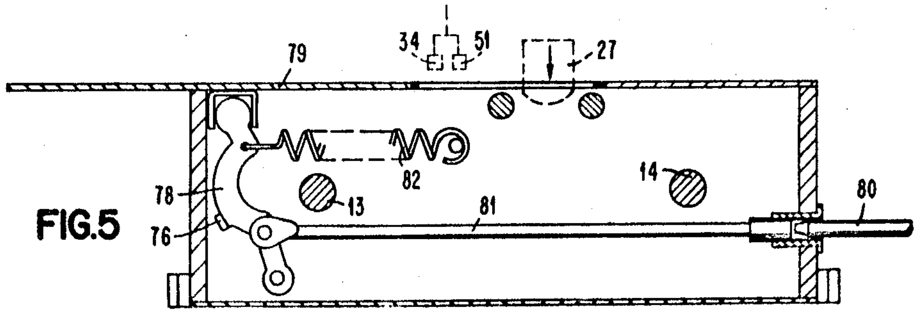
FIG. 5 is a view similar to FIG. 4 but showing the cassette with opened cover.

With the aid of the pretensioned spiral spring 19 this arrangement achieves oppositely directed torques of the two spools 15 and 16—identified by the arrows 23 and 24 in FIG. 3—and thus a tensioning of the magnetic tape 17 which, because the tape does not have a great length, is nearly constant. As will be described further below, the tendency of the system to assume a symmetric center position is utilized to arrest the tape in wound-up condition.

The magnetic tape 17 is in form of a wide band and guided intermediate the spools 15 and 16 via the reversing rollers 25 and 26. Intermediate these latter the magnetic head 27—which is constructed as multiple track head—is shiftable transversely to the band path and can be lifted off the magnetic tape. For controllable shifting of the magnetic tape there is provided a non-illustrated de-coding lever drive or a spindle which is driven by a stepwise operating motor. The contact surface of the magnetic head which contacts the tape, is so wide that it covers approximately half of the width of the tape, to thereby guarantee a guide of the tape free of folds and without necessitating additional contact or pressure means.

A series of approximately 50 recording tracks is provided on the magnetic tape 17, and in these tracks a series of information items can be bit-sequentially stored, with the length of the series corresponding approximately to the amount of text which can be typed onto a normal typewritten page. Of course, the length of the magnetic tape 17 is selected accordingly.

When bits of information are to be stored on the tape, usually by typing the information on a typewriter keyboard, the magnetic tape 17 is advanced by a start-stop mechanism (not shown) by identical distances $u$ in stepwise manner. Such steps correspond to a start-up phase, a phase of constant speed during which the always identically large number of bits corresponding to an item of information is recorded, and a braking phase.

Figure 6:
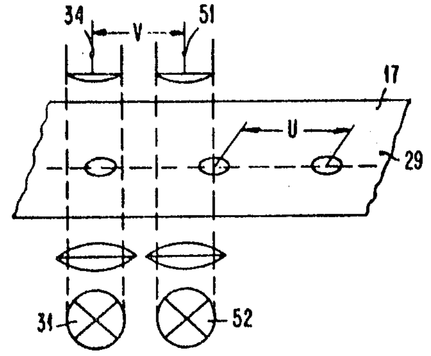
FIG. 6 is a fragmentary plan view illustrating a portion of the magnetic tape in diagrammatic manner, and showing the optical detecting means.
Figure 7:
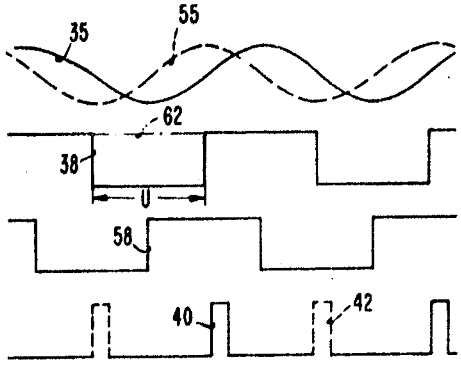
FIG. 7 shows impulse diagrams of the impulses which occur upon scanning of the tape.
Figure 8:
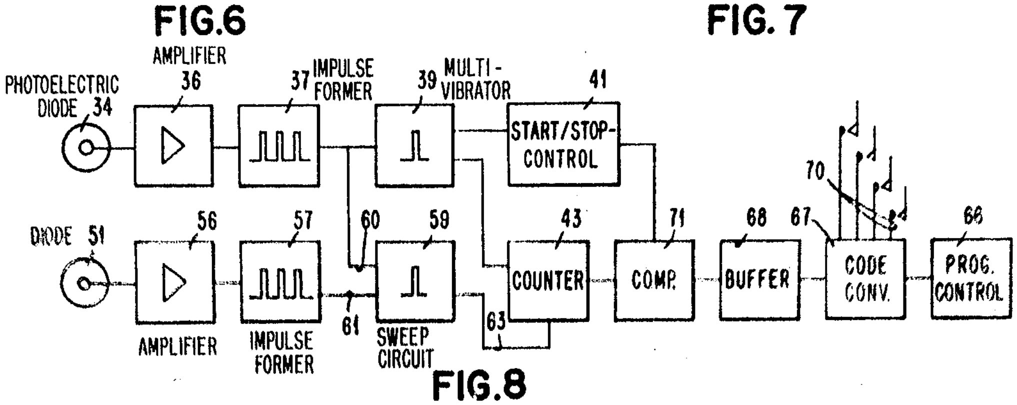
FIG. 8 is a block circuit diagram of the tape control arrangement of the magnetic tape storage device.

The magnetic tape 17 is provided with a perforated track 29 to make possible an identification of the respective tape position. The distance between consecutive perforations of the track 29 corresponds to the aforementioned distance $u$ as is shown in FIG. 6. An optical device is provided for scanning the perforated track 29 and utilizes a light source 31 mounted in the housing of the user device 30, and a light conductor 32 whose end face is opposed to a window or cutout in the frame 11 of the tape cassette. A further light conductor 23 is located within the cassette and guides the light of the light source 31 to the track 29. On the other side oppositely the track 29 there is arranged a photoelectric diode 34 from which signals 35 are transmitted via the amplifier 36 to the impulse former 37 whose switching level is midway between the full light-current and the dark-current of the photoelectric diode 34.

The rectangular impulses 38 which occur at the output of the impulse former 37 excite with their ascending flanks a monostable multivibrator 39 whose impulses 40 influence the start-stop control 41 for terminating the tape advancement. The dimensioning of perforation diameter and diameter of the light beam are so selected that the distance between the switching points of the positive and negative flanks of the signals 35 correspond exactly to the stop-start gap $u$ between the bit regions of two successively stored items of information.

Because the starting distance and the braking distance are identically large, the magnetic tape comes to a rest in the middle between the positive and negative length of the signals 35, in a position in which a perforation is located below the photoelectric diode 34 so that a full or maximum light current flows in the latter. This is true even if the magnetic tape is transported in reverse, for instance for the purpose of corrections or of supplying additional items of information. In this case the impulse flanks of the signals 35 which are descending in the case of forwards movement, have a positive rise so that the monostable multivibrator produces control impulses 42 for stopping of the tape advance. The signals 40 and 42 further control the stepwise forwards or reverse switching of a counter 43 whose setting thus indicates the position of the magnetic tape. The zero setting or reversing of the counter 43 occurs with the aid of a device which cooperates with the just-described detecting arrangement.

A second photoelectric diode 51 is also arranged adjacent the photoelectric diode 34. The diode 51 receives light from the light source 52 via the stationary light conductor 53 and the light conductor 54 located in the cassette, when a perforation passes; the conductors 53 and 54 are constructed analogously to the conductors 32 and 33. The diode 51 is spaced from the diode 34 at a distance $v$ so selected that a rising flank of its signal 55 occurs when the first photodiode 54 is darkened. The rectangular impulses 38 of the diode 34, and of the impulses 58 of the diode 51 which are obtained via the amplifier 56 and the impulse former 57 which also switches at middle current level, constitutes the input of the monostable sweep circuit 59. The first input 60 of the circuit 59 is the so-called preparatory input which so acts that, when an impulse is received at the second input 61, it can produce an output signal at the circuit 59 only when the preparatory input has plus potential. This, however, is not normally the case because of the aforementioned distance $v$ of the two photodiodes 34 and 51, so that normally the sweep circuit is at rest.

If now a reversing of the counter or its zero setting is to be accomplished at the track beginning, then a further perforation is provided between two existing perforations, or two adjacent perforations are connected with one another. In this case the first photoelectric diode 34 produces a signal 62 which assumes a positive level at such time which a positive flank of the impulse 58 occurs. This in turn causes in the output conductor 63 of the sweep circuit signal which causes the reversing of the counter 43. Thus, the latter is always automatically returned to zero at the track beginning.

Because the user apparatus, that is the office machine or the like, is to operated in such a manner that different sections of text—which may be rather short and which are contained in different recording tracks—are to be selectively combinable, a program control arrangement 66 is provided by means of which the operator is enabled to select a desired section of the magnetic tape 17, which section may for instance be characterized by a number and which selection may be effected by depressing a button, for instance. A coding circuit 67 converts the selected setting into the corresponding counter value and sets the value-storing device 68 to the thus obtained value. Because the subdivision of the tape tracks can be different in each individual tape cassette, coding pins 69 are provided at the frame 11 of the cassette (see FIG. 1) which influence contacts 70 when the cassette is inserted into the user device by means of which the coding circuit 67 sets the value storing device 68 to the value corresponding to the selected section of the respective cassette when the number corresponding to a section is selected by an operator via the program control arrangement 66. The counter 43 and the value storing device 68 are connected by a comparator 71 which, when the counter setting of the counter 43 corresponds with the set value of the value storage device 68, produces and forwards a signal to the start-stop control 41 by means of which the tape is set to the respective counter setting of the counter 43.

The optical control influenced by the photoelectric diodes 34 and 51 operates independently of whether the magnetic tape advances stepwise during the recording of information, slowly and continuously during the retrieval and reproduction, or quickly during searching for a specific tape section. However, in the latter case the brake distance is larger than during normal operation with the result that the tape will come to a standstill at a location which is displaced with reference to the desired counter setting. The coincidence is subsequently obtained by a correction involving slow advancement of the tape.

The beginning of the tracks is marked by means of the described optical scanning means. A mechanical arrangement assures that on removal of the cassette from the user device the magnetic tape 17 will always assume a precisely defined starting position. For this purpose the aforementioned characteristic of the system, to assume to achieve a symmetrical position of the tape coils, is utilized. Such movement is prevented, when the largest part of the tape is wound onto the spool 15, by means of an abutment 76 which cooperates with the pin 77 of the spool 15. The abutment 76 is provided at the actuating lever 78 of a device for opening the cassette cover 79 which becomes activated when the cassette is inserted into the user device. The actuating lever 79 is hingedly connected with the cover 79 and is pivoted oppositely the restoring spring 82 via the rod 81 by means of the outer pin 80. As long as the cassette is unconnected with the user device, the abutment 76 thus prevents turning of the spools. There is further provided an arresting arrangement for the sliding cover 79 to prevent an opening of the cassette when the same is not inserted into a user device. Fast with the sliding cover 79 is an abutment 83, and located oppositely that is a locking lever 84 which is guided in a slot, normal thereto by means of the projection 85 for movement in the sleeve 86 of the frame 81. When the cassette is outside of the user device, that is not connected with the same, the spring 87 causes the angled portion of the lever 84 to be oppositely the abutment 83 in which position the cassette cannot be opened. When the cassette is inserted into the user device, the projection 85 abuts against the pin 88 which is fast with the user device and which presses the lever 84 out of the region of the abutment 83, so that the cassette cover 79 can be opened. Once this has occurred, the cassette is ready for operation and the magnet head 27 can be inserted into the interior of the cassette. However, the photoelectric diodes 34 and 51 do not come into contact with the magnetic tape 17.

It will be appreciated that with the construction according to the present invention the selection of individual portions of tape tracks on a magnetic tape, for the purposes outlined earlier, is greatly simplified and also made much more reliable than was heretofore the case.

It will be understood that each of the elements described above, or two or more together, may also find a useful application in other types of constructions differing from the types described above.

While the invention has been illustrated and described as embodied in an information retrieving arrangement, it is not intended to be limited to the details shown, since various modifications and structural changes may be made without departing in any way from the spirit of the present invention.

Without further analysis, the foregoing so fully reveals the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An arrangement of the character described, comprising a plurality of first units each including a pair of spaced rotatable spools accommodated in a casing means; a multiple-track magnetic tape trained about said spools for advancement in a predetermined path; a second unit arranged to cooperate with said first units one at a time and including a magnetic head displaceable transversely to said path; advancing means for advancing said magnetic tape in said path in incremental steps of identical length each corresponding to a different series of bits representing a unit of retrievable information of said tape; a plurality of optically detectable indicia provided on one track of said tape and successively spaced at identical intervals each corresponding to the length of one of said steps; detecting means for optically detecting successive ones of said indicia in response to incremental stepwise advancement of said tape and for producing a recognition signal; storage means actuable in response to detection of successive ones of said indicia for storing the respective recognition signals; and retrieving means for selecting a recognition signal corresponding to a predetermined unit of information which it is desired to retrieve, and for cooperating with said storage means and said advancing means in a sense advancing said tape until correspondence of said predetermined series of bits with said magnetic head.

2. An arrangement as defined in claim 1, said indicia comprising perforations in said tape and said detecting means comprising a light-beam source at one side and a light-sensitive detector including an impulse-producing device at the other side of said tape, the diameters of said perforations and of said light-beam being so related that the spacing between the positive and negative flanks of an impulse originated in said device in response to detection of said light-beam by said detector corresponds to the distance between two consecutive series of bits representing units of information stored on said tape.

3. An arrangement as defined in claim 2, said detector comprising detecting means carrying a first current of a first value when detecting said light beam and a second current of a different second value when not detecting said light beam; said flanks being of identical direction and initiating the formation of impulses in said device; and wherein the response sensitivity of said device is midway between said first and second values.

4. An arrangement as defined in claim 1, said retrieving means comprising selecting means for selecting a value corresponding to the recognition signal of a predetermined unit of information, and comparing means for comparing said value with said recognition signals in said storage means, and for generating a signal influencing operation of said advancing means in response to coincidence of said value and said recognition signal of said predetermined unit of information.

5. An arrangement as defined in claim 4; further comprising a coding circuit cooperating with said storage means and said retrieving means; and contact means on said casing means and cooperating with said coding circuit for effecting a preselection of tape portions in dependence upon cooperation of said second unit with different ones of said first units.

6. An arrangement as defined in claim 1, said storage means being a counter; and further comprising a plurality of apertures provided at predetermined locations of said tape adjacent respective ones of said perforations, scanning means scanning said tape for said apertures, and a coincidence circuit associated with said scanning means and cooperating with said counter for setting the same to zero in response to detection of one of said apertures by said scanning means.

7. An arrangement as defined in claim 1; further comprising a drive shaft for driving said spools; and spring means associated with said spools for imparting to the same mutually oppositely acting torques which compensate one another with reference to said drive shaft, so as to maintain said tape taut at all times.

8. An arrangement as defined in claim 7; and further comprising arresting means for advancing said spools to and maintaining them in a predetermined setting in response to separation of the respective first unit from said second unit and under utilization of residual torque resulting from the presence of unequal amounts of said tape on the respective spools.

9. An arrangement as defined in claim 8; further comprising a pair of shafts each associated with one of said spools, one of said spools being freely rotatably journalled on the associated shaft, and the other of said spools being fast with its associated shaft for rotation therewith; a spiral spring having opposite ends one of which is connected to said one spool and the other of which is connected to the associated shaft; and motion-transmitting means connecting said shafts with one another.

10. An arrangement as defined in claim 8, said casing means including an operable cover; and further comprising release means cooperating with said arresting means and operable for opening said cover in response to cooperation of the respective first unit with said second unit.

11. An arrangement as defined in claim 1, said tape having a predetermined width in direction transversely to said path, and said magnet head having a tape-contacting surface whose width in said direction corresponds to at least substantially half of said predetermined width.

12. An arrangement as defined in claim 1; said casing means comprising normally dust-tight closure means; and disengaging means for disengaging said closure means in response to cooperation of the respective first unit with said second means.

* * * * *